United States Patent
Bentsen et al.

(10) Patent No.: US 7,711,837 B2
(45) Date of Patent: May 4, 2010

(54) TRANSMISSION OF BUSINESS RULES TO PORTABLE DEVICES

(75) Inventors: Brett A. Bentsen, Bellevue, WA (US); Udiyan I. Padmanabhan, Redmond, WA (US); Jordan B. Naftolin, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 830 days.

(21) Appl. No.: 11/301,443

(22) Filed: Dec. 13, 2005

(65) Prior Publication Data

US 2007/0136444 A1 Jun. 14, 2007

(51) Int. Cl.
*G06F 15/16* (2006.01)
(52) U.S. Cl. ...................................... 709/230
(58) Field of Classification Search .............. 709/219, 709/220, 230
See application file for complete search history.

(56) References Cited

U.S. PATENT DOCUMENTS

| | | | | |
|---|---|---|---|---|
| 6,035,327 | A * | 3/2000 | Buckley et al. | 709/206 |
| 6,549,917 | B1 * | 4/2003 | Pollard et al. | 707/201 |
| 6,697,944 | B1 * | 2/2004 | Jones et al. | 713/168 |
| 6,856,679 | B2 * | 2/2005 | Pennington et al. | 379/265.01 |
| 7,415,721 | B2 * | 8/2008 | Fransdonk | 726/4 |
| 2003/0204846 | A1 * | 10/2003 | Breen et al. | 725/39 |
| 2005/0177624 | A1 * | 8/2005 | Oswald et al. | 709/219 |

* cited by examiner

*Primary Examiner*—Wing F Chan
*Assistant Examiner*—Tesfay Yohannes
(74) *Attorney, Agent, or Firm*—Woodcock Washburn LLP

(57) ABSTRACT

A system that facilitates implementation of business rules for multimedia content on a portable device comprises a receiver component that receives a request for support of extensions to a protocol that enable transfer of customized business rules associated with multimedia content from a host device to a portable device, the portable device is a closed system. A servicing component provides the requested support to an entity that initiated the request.

17 Claims, 13 Drawing Sheets

TRANSMISSION OF BUSINESS RULES TO PORTABLE DEVICES

BACKGROUND

The entertainment industry, which includes movies, music, and the like, generates several billion dollars per year. In the past, revenue with respect to movies was created through box-office sales at multiple theaters. Through permeation of home-video players, such as video cassette recorders and DVD players, film studios have been able to generate additional revenue through sale of movies that can be watched in one's home. Movie rental companies have enabled millions of users to enjoy a vast number of films in the comfort of their own homes for minimal cost. One drawback of the recent past, however, is that one wishing to rent or purchase a film must physically travel to a video store to select and rent a movie, and upon viewing such movie return the media that encapsulates the film prior to a pre-determined date. If the renter of the movie, purposefully or otherwise, does not return the media by the predetermined date, then such renter incurs additional fees. Another deficiency associated with the conventional rental agency is the finite nature of media that is utilized to encapsulate film. In more detail, individuals can be frustrated if they travel to a rental store only to find that a film they wish to view is unavailable (e.g., each copy of the film has been rented by others).

The music industry has, in the past, faced similar problems. For instance, those wishing to enjoy a particular musical act were forced to travel to watch such musicians perform. The invention of the radio enabled listeners to enjoy music and other programs in their own homes, although such listeners lacked an ability to select a particular song or musician. Phonograms were later provided for sale to those who wished to enjoy content of a particular record at any time of their choosing—however, such phonograms are often associated with poor sound quality, are easily damaged, and lack portability. Audio cassettes and compact disks have been provided by the music industry to overcome the deficiencies associated with the phonogram, but still require utilization of physical media to retain a song or songs. Thus, as with films, users in the recent past were required to travel to a store to search for a particular compact disk. Furthermore, these disks are still subject to scratching and other damage.

Advances in computing and networking have enabled mitigation of many of the above-described deficiencies. In one example, rather than traveling to a rental company to lease a film, one can now request such movie from a cable company through utilization of a remote control. For instance, a user interface can be provided on a television listing a plurality of available films, and through selection of a button or sequence of buttons the user can select a desired film. The film can then be provided to such user electronically through a cable line and a cable box. The movie is provided with particular rules that prohibit unrestricted access to such movie. For example, a common rule is to enable viewing of the film for a twenty-four hour period, and thereafter preventing the viewing of such film. Another rule may enable a user to view the film a pre-defined number of times. It can thus be discerned that various rules can be effectuated with respect to multimedia content to protect copyright rights of owners of the content.

Portable devices have also been associated with rapid technological advancements. For instance, in the recent past, size of so-called portable cellular telephones prohibited easy transportation of such telephones. Rather, the bulky devices had to be placed in a handbag, backpack, or similar item to enable movement of such device with an individual. Moreover, these phones (and other portable devices) were not associated with graphical user interfaces and had battery life that was less than half an hour. In contrast, today's cellular telephones can weigh less than a pound, slide easily into one's pocket, and are associated with colored user interfaces with screen resolutions that enable clear depiction of a picture. Other portable devices, such as personal digital assistants (PDAs), portable music players, and the like have also been associated with increase in functionality, display capabilities, and battery life as well as decrease in size.

These advances in technology have enabled portable devices to be employed in connection with review and editing of multimedia content. For instance, a home-movie can be created and/or transferred to a personal computer, which in turn can be employed to transfer such movie to a portable device. The movie can thereafter be reviewed upon such device so long as the device is associated with an application that can comprehend and render the movie to a graphical user interface. Movie and music studios, as well as other entertainment and media companies, however, have been hesitant to digitize copyrighted works for use in portable devices due to difficulties in prevention of piracy.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its sole purpose is to present some concepts in a simplified form as a prelude to the more detailed description that is presented later.

The claimed subject matter relates generally to a protocol and extensions thereto that enable business rules to be transferred to a portable device together with multimedia, wherein usage of the multimedia content is controlled based at least in part upon the business rules. The extensions to the protocol can support various attributes that describe manners in which multimedia content can be employed once resident upon a portable device. For example, an attribute can be set that describes multimedia content as premium content, meaning that a premium content rules engine can evaluate the multimedia content. The attribute can be associated with several disparate values, wherein different values can indicate various device-side rules that should be followed. The protocol extensions can support other attributes, which can indicate an amount of time within which the multimedia content can be reviewed, a number of play periods that can be associated with the multimedia content, a date that describes a last day that the multimedia content can be reviewed, etc. Moreover, the protocol extensions can enable attributes to be set that prevent resetting of other attributes, prevent copying of the multimedia content to different devices, delete the multimedia content given particular requirements, etc.

In a particular example, a provider of videos may wish to enable renting of such videos to portable digital devices that have sufficient processing power, memory, and screen resolution to graphically present such videos to a user. Rental of videos to such devices provides a new stream of revenue to owners of the video content; however, due to concerns relating to unauthorized use of the videos, providers of the videos have heretofore been hesitant to enable rental of video in such a manner. Through utilization of the protocol extensions described herein, however, usage of the videos (or other suitable multimedia content) can be controlled through business rules. Thus, when providing a multimedia item to the portable device, a provider of the multimedia item can package business rules therewith that control usage of such item. In a particular example, a video provider can restrict a number of views of a video to three and/or can restrict a number of views of the video to a twenty-four hour period. Thereafter, the video can be automatically deleted from the portable device (through business rules transferred to the portable device by way of the protocol extensions).

To effectuate transfer of multimedia content and associated business rules to a portable device, such device can be communicatively coupled to a host device and synchronized with the host device. Upon occurrence of synchronization between the host device and the portable device, the host device can receive an indication that premium multimedia content is desirably transferred to the portable device. The host device can query the portable device to determine whether the portable device supports protocol extensions that enable business rules to be associated with the multimedia content and transferred to the portable device. If the portable device does not support such protocol extensions, a user can be prompted to associate the portable device with such extensions (through download from a server and/or from the host device). Once the portable device is associated with support for the extensions, the multimedia content and associated business rules can be relayed to the portable device. Alternatively, the portable device can include an application that will not execute multimedia content if such portable device is not associated with support for the protocol extensions.

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed matter is intended to include all such aspects and their equivalents. Other advantages and novel features may become apparent from the following detailed description when considered in conjunction with the drawings.

DETAILED DESCRIPTION

Figure 1:
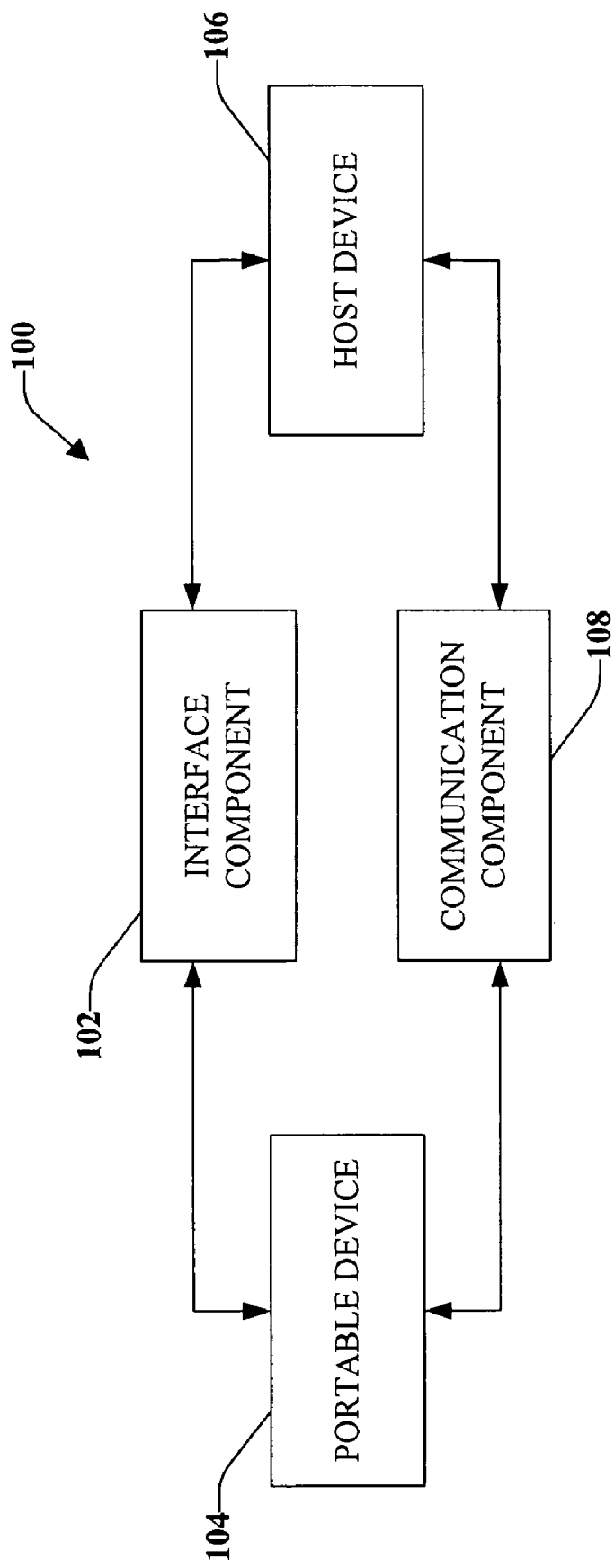
FIG. 1 is a high-level block diagram of a system that facilitates communication of business rules and multimedia content between a host device and a portable device.

The subject invention is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such subject matter may be practiced without these specific details. In other instances, well-known structures and devices are shown in block diagram form in order to facilitate describing the subject invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers. The word "exemplary" is used herein to mean serving as an example, instance, or illustration. Any aspect or design described herein as "exemplary" is not necessarily to be construed as preferred or advantageous over other aspects or designs.

Furthermore, aspects of the claimed subject matter may be implemented as a method, apparatus, or article of manufacture using standard programming and/or engineering techniques to produce software, firmware, hardware, or any combination thereof to control a computer to implement various aspects of the subject invention. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of what is described herein.

The claimed subject matter will now be described with respect to the drawings, where like numerals represent like elements throughout. The claimed subject matter relates generally to transportation of one or more business rules to a portable device. The portable device can then enforce the business rule through utilization of a digital rights management system resident upon such portable device. Currently, particularly with video content, there is insufficient protection with video, as business rules cannot be transferred to portable devices (such as portable media players) with video content. Accordingly, content providers today do not make premium video content available with respect to portable devices.

Referring now to FIG. 1, a business rule communication system 100 is illustrated. The system 100 includes an interface component 102 that interfaces a portable device 104 to a host device 106. For example, the portable device 104 can be a dedicated portable media player, a portable telephone with multimedia functionality associated therewith, a personal digital assistant, or any other suitable portable device. Furthermore, the portable device 104 can be a closed system. More specifically, the portable device 104 may not be capable of and/or restricted from being updated with applications associated with a content provider that can be utilized for protecting premium content. For example, with respect to personal computers, content providers can write an application that can run on a personal computer. The application can then communicate with a content provider and receive business rules from the content provider. Business rules, as used herein, are rules that restrict usage/review of particular content. An example of a business rule would be that a movie can be played beginning on a first date and cannot be played after a second date, can be played any number of times between such dates, and should be deleted from the device after passage of the second date. Another example business rule would be that a movie can be played starting on a particular date and any time thereafter for five twenty-four hour periods. After receiving one or more business rules from the content provider, the application can enforce such business rules. In closed systems, however, there is no suitable mechanism for an end user to install a new application. Rather, updates to the mobile device 104 may be restricted to updates to applications packaged with the mobile device 104 at a time of sale. Accordingly, there is no suitable mechanism for transmitting and/or enforcing business rules associated with multimedia content to portable devices.

The interface component 102 can be hardware, software, a combination of hardware and/or software, a protocol, a schema, and the like, wherein such interface component 102 is utilized in connection with transferring a customized business rule from the portable device 104 to the host device 106. For example, the interface component 102 can be a USB cable, a USB port, or other interface infrastructure. The interface component 102 can be associated with a communication component 108 that facilitates communication of the multimedia content and an associated customized business rule from the host device 106 to the portable device 104. For example, the communication component 108 can be and/or include a protocol and/or extensions to such protocol.

Additionally, the communication component 108 can be configured to communicate the multimedia content by way of a protocol and communicate the customized business rule through utilization of the protocol extensions. For instance, the protocol can be the Media Transfer Protocol, which enables media files to be transferred between host devices and mobile devices. Extensions to such protocol can enable customized business rules to be transferred from the host device 106 to the portable device 104. Therefore, if the portable device 104 supports the extensions, multimedia content and associated business rules and be received and implemented at the portable device 104

In one particular example of a utilization of the system 100, the host device 106 can be a personal computer that receives content from a content provider, such as a movie studio, a movie rental agency, a cable television provider, or any other suitable content provider. In particular, the host device 106 can be coupled to a server by way of the Internet or an intranet, and can receive multimedia content and business rules associated with such content from such server. Thereafter, the interface component 102 can be employed to associate the host device 106 with the portable device. For example, the interface component 102 can be utilized in connection with synchronizing the host device 106 and the portable device 104. Upon the host device 106 and the portable device 104 being communicatively coupled, the communication component 108 can be employed in connection with communicating the multimedia content and the associated business rules to the portable device 104. For example, the communication component 108 can be, include, and/or utilize a protocol for transferring media files and extensions to such protocol, wherein the extensions enable setting of particular attributes understood by software on the portable device 104. For example, certain values in particular attributes can define a number of times the multimedia content can be played on the portable device 104, and that the content should be deleted thereafter.

In other examples, the portable device 104 can be directly coupled to a content provider, such as a server, through any suitable communications means. For example, if the portable device 104 includes hardware and/or software that enables direct connection to the content provider, the content provider can provide the portable device 104 with the multimedia content and associated business rule(s) directly (e.g., by way of the communication component 108). In this instance, a server associated with the content provider can be the host device 106. In yet another example, multimedia content and associated business rules can be transferred between portable devices. Thus the host device 106 can be a portable device that includes multimedia content and associated business rules, which can be communicated to the portable device 104 by way of the communication component 108 and/or the interface component 102.

Figure 2:
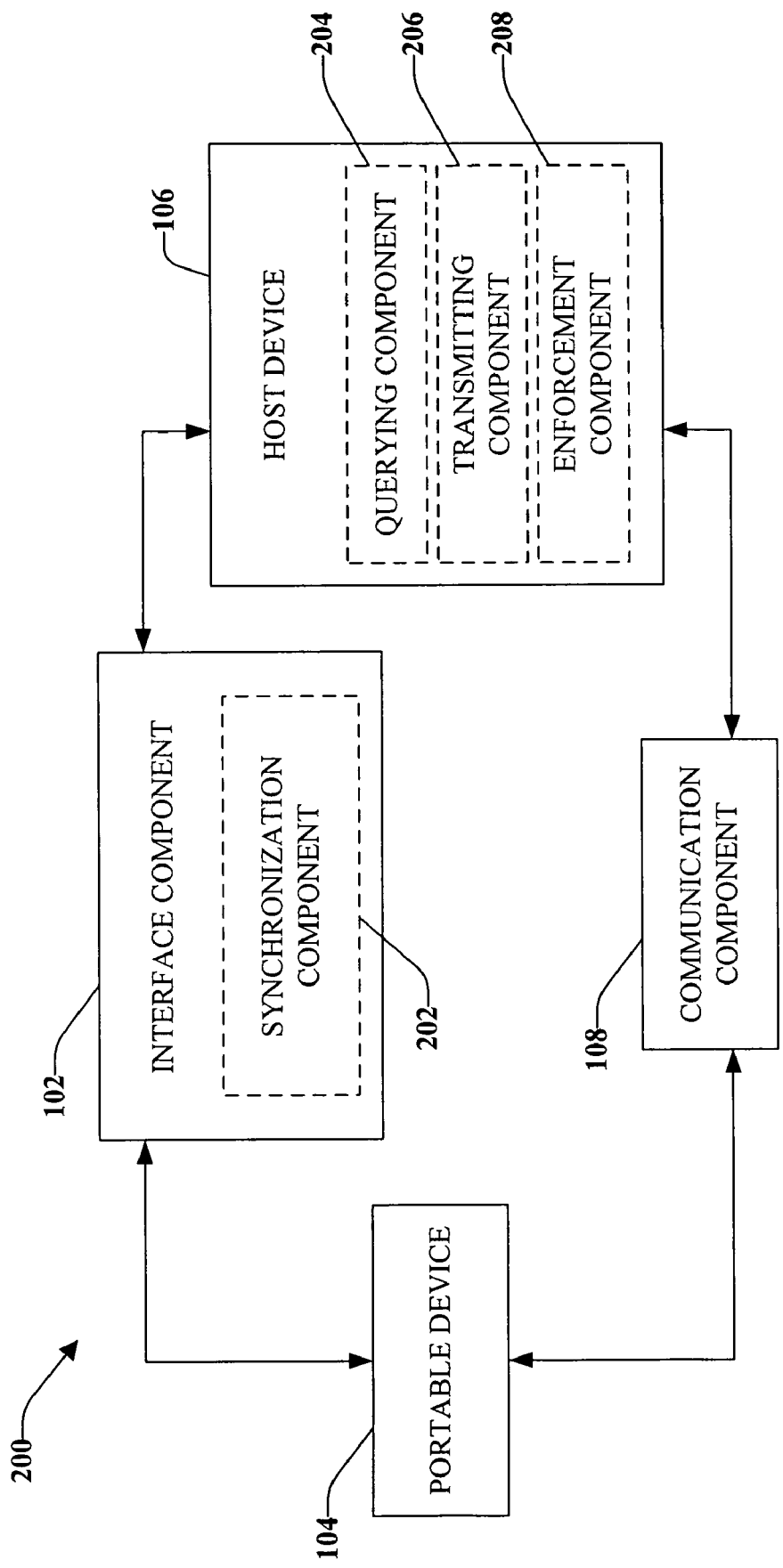
FIG. 2 is a block diagram of a system that facilitates determining whether a portable device supports protocol extensions for communications of business rules to the portable device.

Turning now to FIG. 2, a multimedia content and associated business rules communication system 200 is illustrated. The system 200 includes the interface component 102, which is utilized to associate the portable device 104 and the host device 106. The interface component 102 can include a synchronization component 202 that is employed to synchronize the portable device 104 with the host device 106. For example, the synchronization component 202 can control handshaking and authentication between the portable device 104 and the host device 106. In other words, the synchronization component 202 can monitor, control, and/or facilitate a sequence of communications undertaken between the portable device 104 and the host device 106 to enable agreement between the portable device 104 and the host device 106 regarding modes of operation of such devices. Further, the synchronization component 202 can establish communication rates between the portable device 104 and the host device 106. While the synchronization component 202 is illustrated as residing within the interface component 102 and separate from the portable device 104 and the host device 106, it is understood that the synchronization component 202 can reside within the portable device 104, the host device 106, and/or be distributed therebetween.

The host device 106 can include a querying component 204 that queries the portable device 104 to ensure that the portable device 104 supports protocol extensions that enable business rules to be transmitted to the portable device 104 and enforced by the portable device 104. For example, the querying component 204 can perform such querying after the portable device 104 and the host device 106 have been synchronized. If the portable device 104 supports the protocol extensions, multimedia content and associated business rules can be provided the portable device 104 by way of, for example, the communication component 108. If the querying component 204 determines that the portable device 104 is associated with support for the protocol extensions, a transmitting component 206 on the host device 106 can transmit multimedia content by way of the protocol and transmit the associated business rules via the protocol extensions to the portable device 104.

The host device 106 can further include an enforcement component 208, wherein the enforcement component 208 prohibits transmittal of multimedia content from the host device 106 to the portable device 104 if the portable device 104 does not support the protocol extensions. As described above, the protocol extensions enable business rules to be transmitted from the host device 106 to the portable device 104, such that viewing and/or transmittal of multimedia content can be controlled to reduce concerns of piracy. If the portable device 104 does not support the extensions, it cannot receive the business rules, and thus piracy or improper use of multimedia content can occur.

Figure 3:
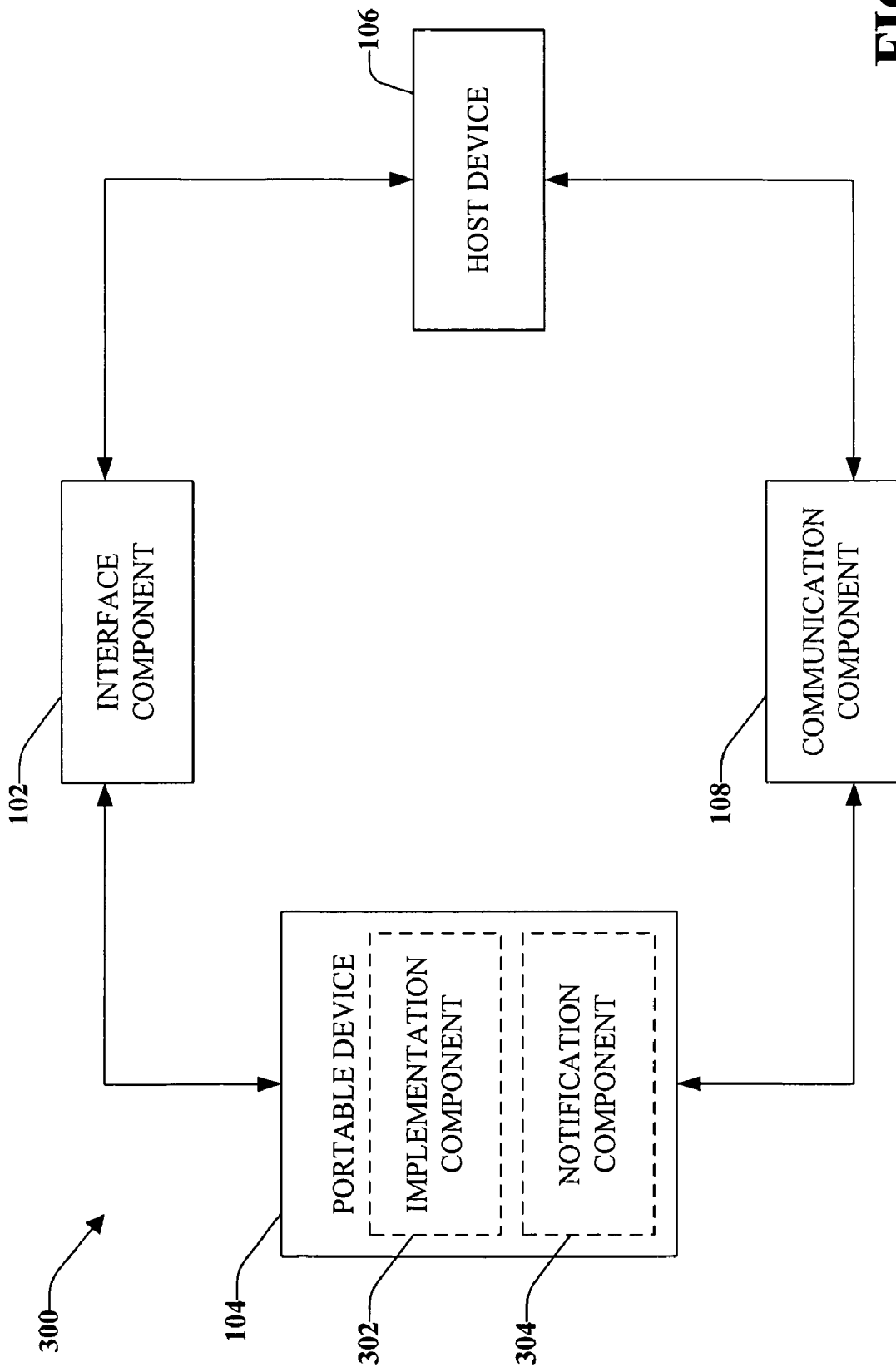
FIG. 3 is a block diagram of a system that facilitates notifying a user of status of multimedia content at a portable device based at least in part upon one or more business rules associated with the multimedia content.

Turning now to FIG. 3, a system that facilitates enforcement of business rules at a portable device is illustrated. The system 300 includes the interface component 102 that associates the portable device 104 and the host device 106, and the communication component 108 that facilitates communication of multimedia content and business rules associated therewith between the host device 106 and the portable device 104. As described infra, the communication component 108 can be a protocol and extensions thereto, wherein the protocol facilitates transmittal of multimedia content between the host device 106 and the portable device 104 and the extensions to such protocol enables transmittal of business rules associated with the multimedia content between the devices 104 and 106.

The portable device 104 can include an implementation component 302 that enforces received business rules with respect to multimedia content associated therewith. For example, if a received business rule indicates that the multimedia content can be viewed three times and then must be deleted from the portable device 104, then the implementation component 302 can enforce such rule on the portable device 104. For instance, an application that is utilized to run the multimedia content on the portable device 104 can also analyze and implement the received business rule. The portable device 104 can further include a notification component 304 that provides a notification to a user of the portable device 104 based at least in part upon the received business rule. Additionally, the notification can be graphics and text provided to a graphical user interface of the portable device 104. Moreover, the notification can be a vibration, a combination of audio and video, and the like. In a particular example, the business rule can allow the portable device 104 to play the multimedia content three times in a forty-eight hour period. After each play, the notification component 304 can provide to the user a graphical indication of a number of plays remaining. Furthermore, the notification can inform a user that an additional license with respect to certain multimedia content is required.

Figure 4:
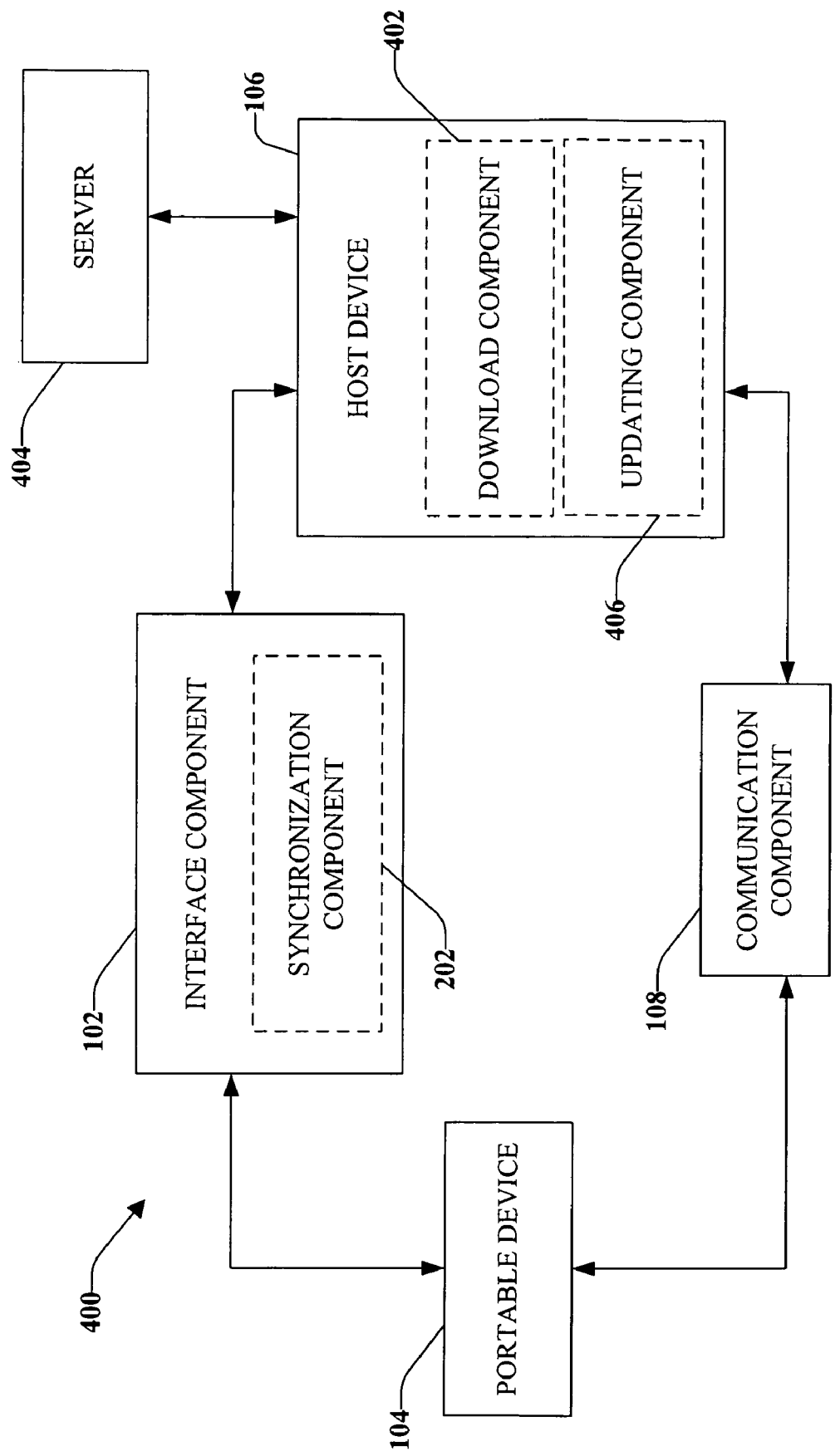
FIG. 4 is a block diagram of a system that facilitates downloading support for protocol extensions that enable transmission of business rules to a portable device.

Now referring to FIG. 4, a system 400 that facilitates transmittal of multimedia content and business rules associated therewith to a portable device is illustrated. The system 400 includes the interface component 102 that associates the portable device 104 with the host device 106, the synchronization component 202 that synchronizes the portable device 104 and the host device 106, and the communication component 108 that enables business rules to be transmitted between the host device 106 and the portable device 104. The host device 106 can include a download component 402 that can download multimedia content from a server 404 that is associated with a content provider. Alternatively or additionally, the server 404 can be associated with a provider/maintainer of a protocol and extensions thereto, and the download component 402 can retrieve support for such protocol and extensions from the server 404 and provide it to the host device 106. Further, the download component 402 can receive a one-time license for the protocol and extensions thereto. The host device 106 can then provide such license to the portable device 104. The host device 106 can also include an updating component 406 that receives updates to the protocol and provides the portable device 104 with such updates. For example, the protocol utilized to transfer business rules between the host device 106 and the portable device 104 can be updated by a maintainer of such protocol to support additional attributes, and thus creation of additional and more robust business rules. The updating component 406 can receive such updates from the server 404 and provide the updates to the portable device 104 upon the portable device 104 and the host device 106 becoming synchronized.

Referring now to FIGS. 5-8, methodologies in accordance with the claimed subject matter will now be described by way of a series of acts. It is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 5:
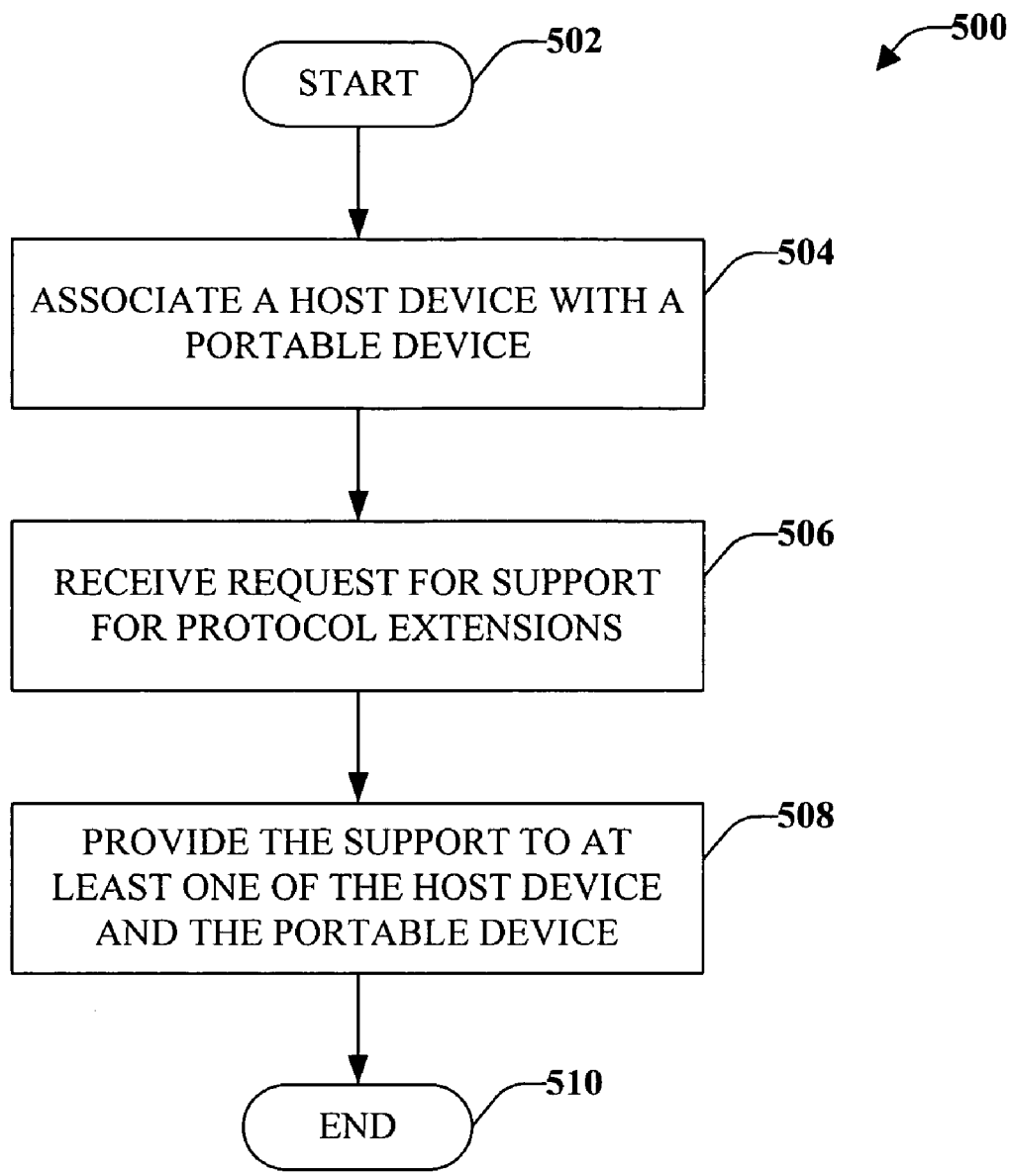
FIG. 5 is a representative flow diagram illustrating a methodology for providing support for extensions to a protocol that enable transmission of business rules associated with multimedia content to a portable device.

Referring specifically to FIG. 5, a methodology for providing support for protocol extensions that enable transmittal of business rules to a portable device is illustrated. The methodology 500 starts at 502, and at 504 a host device is associated with a portable device, wherein the portable device can be a closed system. Furthermore, the host device can be a personal computer, a server accessible by way of the Internet or an intranet, another portable device, or any other suitable device. The association can be made through cabling, wireless connections, over the Internet, over an intranet, infrared, etc. At 506, a request for support of the protocol extensions is received. For example, the request can originate at the host device that is associated with the portable device, wherein the request is provided to a server associated with a maintainer of the protocol and extensions thereto. Similarly, the request can originate from the portable device and be provided to the host device (which may then access a server that maintains the protocol and/or protocol extensions).

At 508, support for the protocol extensions is provided to at least one of the host device and the portable device. For instance, if the host device generates the request, then the support for the protocol extensions can be provided to such host device. Similarly, if the portable device requests such support, it can be provided from a server and/or from the host device that is associated with the portable device. The support can include support for various attributes, including expression attributes and enforcement attributes. Expression attributes can be utilized to control state of multimedia content and can usually indicate terminal conditions for existence of the content on the portable device. Enforcement attributes can describe actions that will be undertaken depending on the state of the content. Particular expression attributes and enforcement attributes are described in more detail supra. The methodology 500 then completes at 510.

Figure 6:
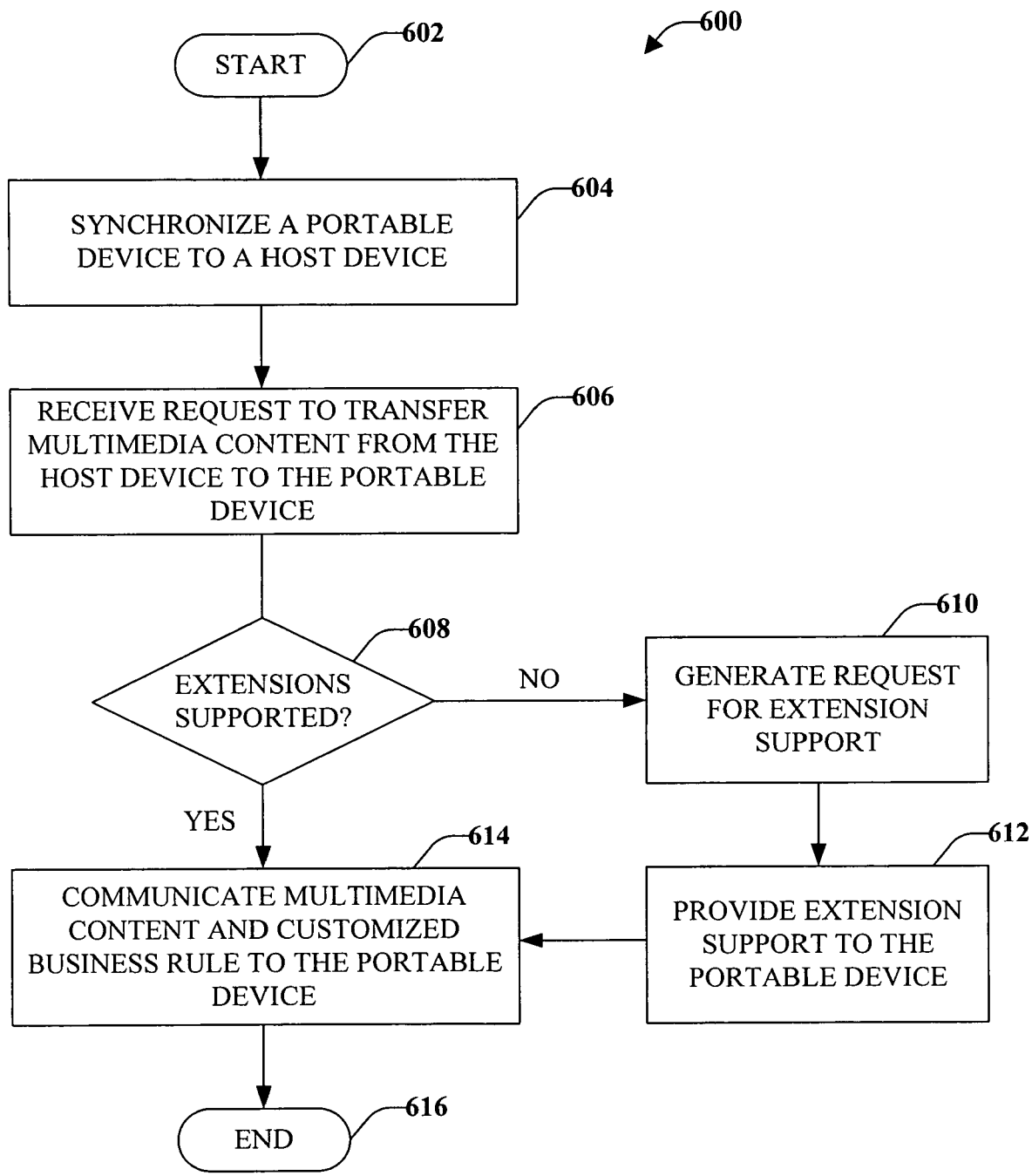
FIG. 6 is a representative flow diagram illustrating a methodology for communicating multimedia content and associated business rules to a portable device.

Now turning to FIG. 6, a methodology 600 for communicating multimedia content and an associated, customized business rule to a portable device is illustrated. The methodology 600 starts at 602, and at 604 a portable device is synchronized with a host device. For instance, this can be accomplished upon coupling the portable device and the host device via a USB connection. At 606, a request to transfer multimedia content from the host device to the portable device is received. This request can be automatically generated upon connecting the host device and the portable device, after specifying a file that is desirably transferred at the host device or the portable device, or the like.

At 608, a determination is made regarding whether the protocol extensions are supported at the portable device. For example, the host device can interrogate the portable device to determine whether the portable device supports the protocol extensions. If the extensions are not supported at the portable device, at 610 a request for such support can be generated by the host device, for example, and provided to a server that maintains support for the protocol and/or extensions thereto. The server can then service the request for the support and provide it to the host device. At 612, the support for the protocol extensions can be provided to the portable device. The methodology 600 can then proceed to 614. If a determination is made that extensions are supported at 608, then at 614 multimedia content and a customized business rule can be communicated from the host device to the portable device. The portable device can then be utilized to play the multimedia content subject to conditions of the business rule. The methodology then completes at 616.

Figure 7:
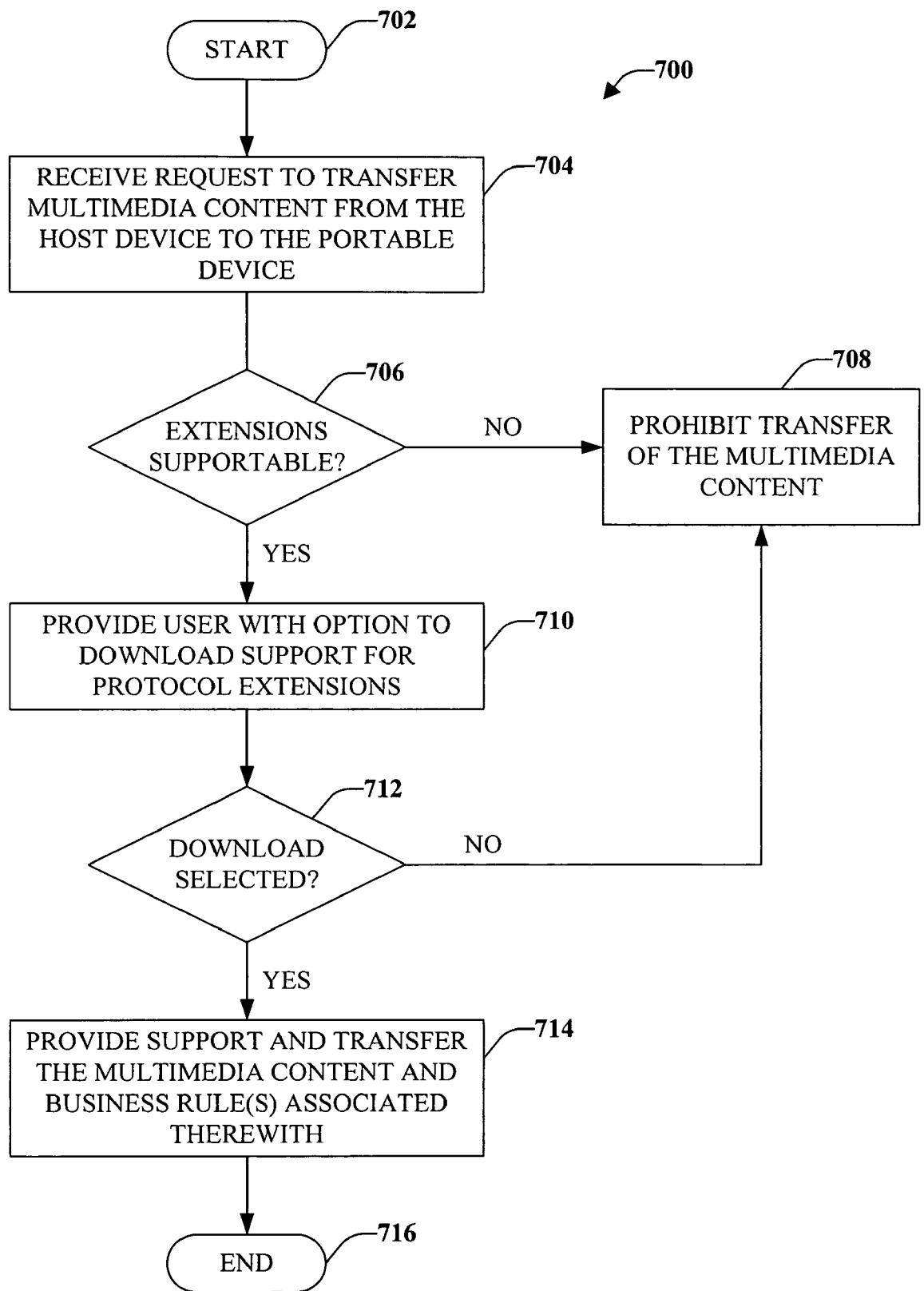
FIG. 7 is a representative flow diagram of a methodology for providing support for extensions to a protocol that enable transmission of business rules associated with multimedia content to a portable device.

Now referring to FIG. 7, a methodology 700 for providing support for transfer of multimedia content is illustrated. The methodology 700 initiates at 702, and at 704 a request to transfer multimedia content from a host device to a portable device is received at the host device. At 706, a determination is made regarding whether the portable device is able to support the protocol extensions. For instance, the portable device may be associated with an application that does not support the protocol extensions. If the extensions cannot be supported by the portable device, then transfer of the multimedia content to the portable device can be prohibited at 708. Therefore, content providers can be comforted in that the multimedia content will not be transferred without an associated business rule. Thus, the content provider can maintain control over the multimedia content once digitized.

If the extensions are supportable, the user can be provided with an option to download support for the protocol extensions at 710. For instance, this option can be provided at the host device in the form of one or more graphical icons. At 712, a determination is made regarding whether the user agreed to download support for protocol extensions that enable transmission of business rules with multimedia content. If the user declined to download the support, transfer of the multimedia content can be prohibited at 708. Additionally or alternatively, multimedia content provided to a portable device that does not support the protocol extensions may not be playable upon such device. If the user agreed to download support for the extensions, support for such extensions can be provided to the portable device at 714. Additionally, the requested multimedia content (and business rules associated with the content) can be provided to the portable device after such device has downloaded and implemented support for the protocol extensions. The methodology 700 then completes at 716.

Figure 8:
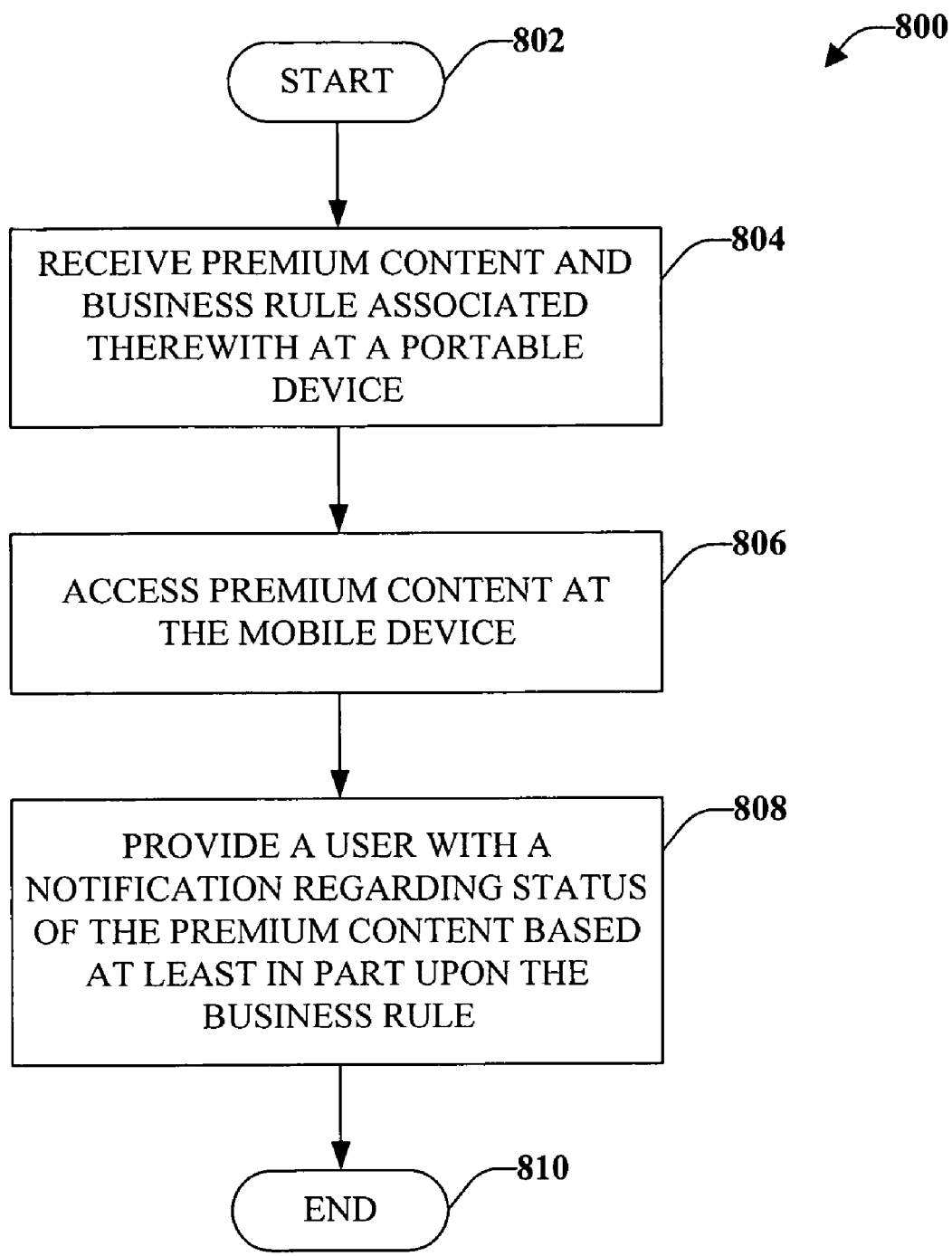
FIG. 8 is a representative flow diagram of a methodology for notifying a user of status of multimedia content on a portable device based at least in part upon business rules associated therewith.

Turning now to FIG. 8, a methodology 800 for notifying a user of status of multimedia content on a portable device is illustrated. The methodology 800 starts at 802, and at 804 premium content is received at a portable device together with a business rule associated therewith. Premium content can be any suitable digital content with respect to which the content provider wishes to maintain usage control. One possible example of premium content is digital video, such as a movie or television program. At 806, the premium content is accessed at the portable device. A user can initiate review of a movie by depressing one or more buttons associated with the mobile device. Similarly, through voice commands the user can initiate playing of an audio/video file. At 808, a user is provided with a notification regarding the status of the premium content based at least in part upon the business rule. For instance, if a business rule associated with the premium content limits a number of reviews of such content to three, then the notification can inform the user of a number of reviews remaining. The methodology 800 can then complete at 810.

Figure 9:
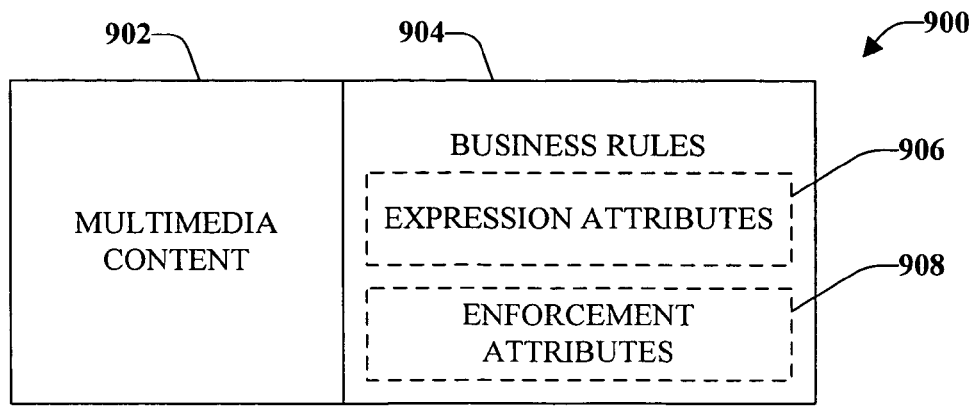
FIG. 9 is a conceptual diagram of multimedia content and business rules associated therewith.

Now referring to FIG. 9, an exemplary data packet 900 or data stream that can be provided to a portable device to a host device is illustrated. The data packet 900 can include multimedia content 902, such as video, audio, or other suitable multimedia content that is associated with a creator, owner, or other entity with an interest in such content. The data packet 900 can further be associated with business rules 904, wherein such business rules can be employed to control usage of the multimedia content. To effectuate the business rules, expression attributes 906 and enforcement attributes 908 can be set in a particular manner, wherein an extension to a protocol enables setting of the attributes and deliverance thereof to a portable device. As described above, the expression attributes 906 can be employed to control state of the multimedia content 902, and can indicate terminal conditions for existence of the multimedia content 902 on the portable device. The enforcement attributes 908 can describe actions depending upon state of the multimedia content 902. Setting of these attributes in particular manners can cause a desirable business rule to be created and associated with the multimedia content 902.

Figure 10:
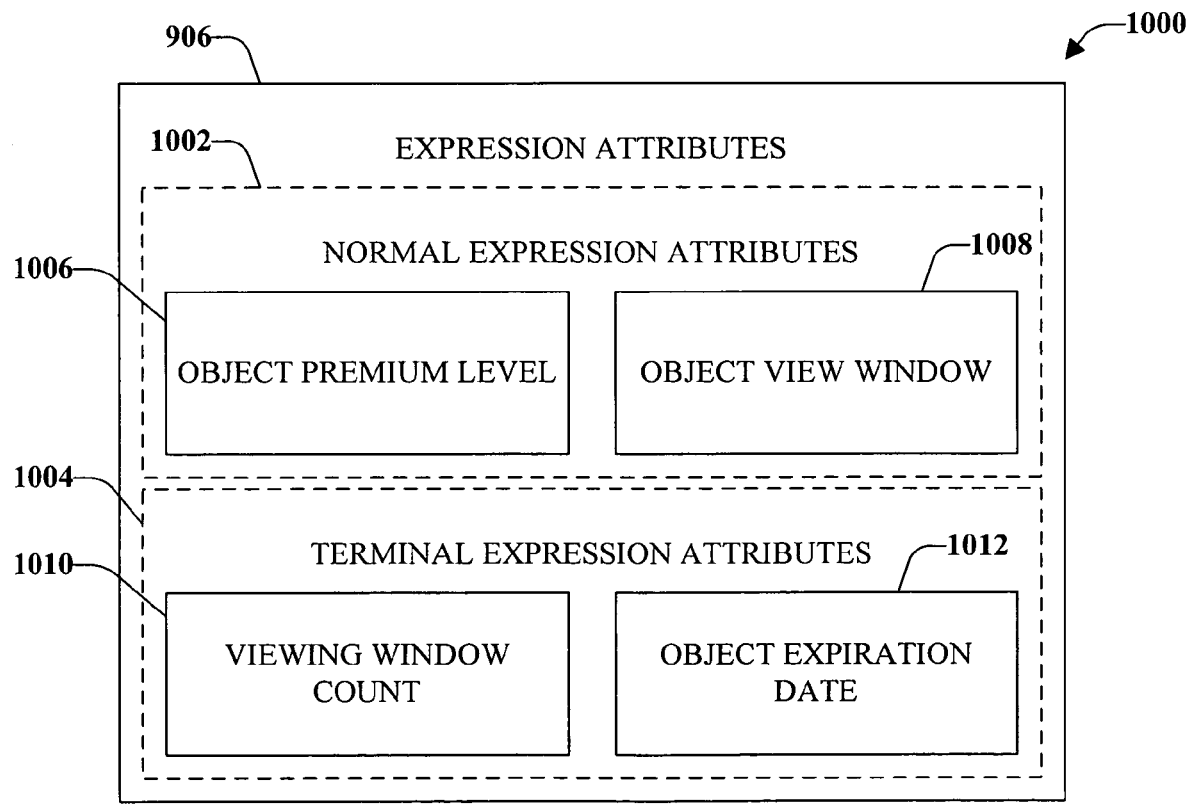
FIG. 10 is a conceptual diagram of expression attributes that can be set in connection with the protocol extensions described herein.

Now turning to FIG. 10, a conceptual depiction 1000 of the expression attributes 906 is illustrated. The expression attributes 906 can include normal expression attributes 1002 and terminal expression attributes 1004, wherein the terminal expression attributes 1004 relate to deleting the multimedia content 902 (FIG. 9) from a portable device. The normal expression attributes 1002 can include an object premium level attribute 1006 and an object view window attribute

1008. The object premium level attribute 1006 can indicate to a portable device that the multimedia content 902 is premium content that needs to be evaluated by a premium rules engine associated with the portable device. For example, the object premium level attribute 1006 can be a string that can be represented as an N bit integer for evaluation at the portable device, where N is an integer. Upon conversion, a positive value can indicate that the multimedia content 902 should be treated as premium content. Moreover, different positive values can be employed to indicate various portable device-side rules that are to be followed.

The object view window attribute 1008 can be utilized to relay to the portable device a period of playback time within which the multimedia content 902 can be rented commercially. Content can be rented for multiple viewing window periods. An analogue for this is a rental period on pay per view movies on cable television. The object view window attribute 1008 can be expressed as a string that can be literally represented as an M bit integer value expressed in minutes of time, where M is an integer.

The terminal expression attributes 1004 can include a viewing window count attribute 1010 that can indicate a number of play periods specified by the object view window attribute 1008 for a particular device. The terminal expression attributes 1004 can also include an object expiration date attribute 1012. For instance, premium content that is rented usually has a terminal expiration date in addition to an allowed viewing window, thereby assuring that the multimedia content 902 is not retained forever upon the portable device. The object expiration date attribute 1012 can be expressed as a string that is converted into a date value at the portable device. Each of the aforementioned attributes is transferable by way of extensions to a protocol for communicating multimedia. Other suitable normal and terminal expression attributes are also contemplated and intended to fall under the scope of the hereto-appended claims.

Figure 11:
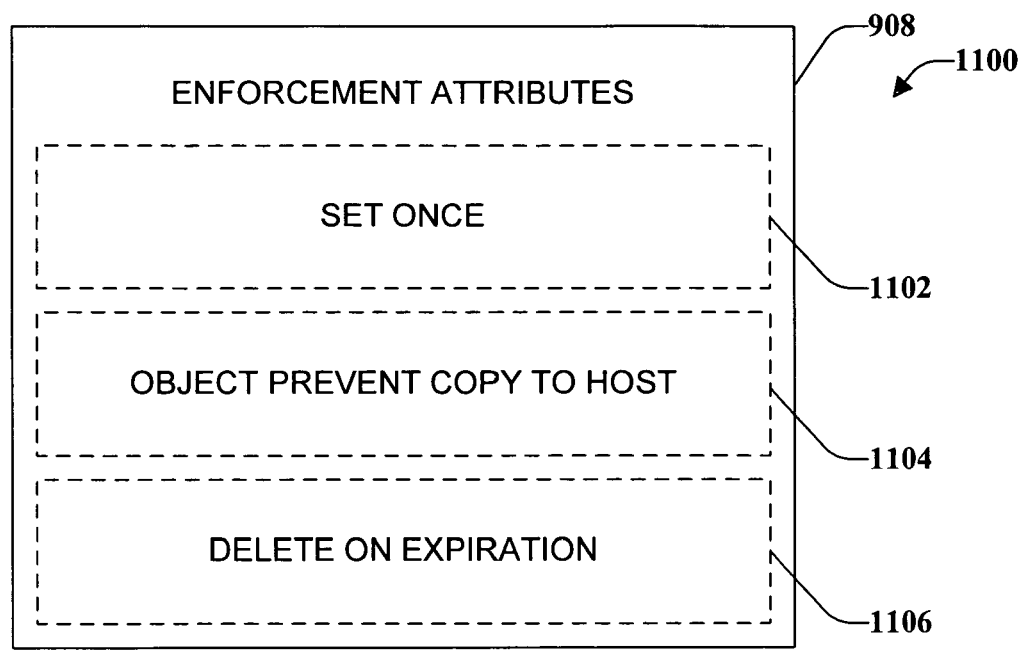
FIG. 11 is a conceptual diagram of enforcement attributes that can be set in connection with the protocol extensions described herein.

Turning now to FIG. 11, a conceptual depiction 1100 of various enforcement attributes 908 (FIG. 9) is illustrated. For instance, the enforcement attributes 908 can include a set once attribute 1102. For example, values delivered to a portable device associated with the multimedia content 902 can only be sent once, and the portable device can disallow the values from being set again. For instance, the set once attribute 1102 can be implied and not exposed for unset with respect to multimedia content that is associated with certain values in the object premium level attribute 1006 (FIG. 10). The enforcement attributes 908 can also include an object prevent copy to host attribute 1104, which when set indicates that the multimedia content 902 associated with such attribute 1104 should not be transferred from a portable device. The object prevent copy to host attribute 1104 can thus be employed to prevent redistribution of the multimedia content 902. The enforcement attributes 908 can additionally include a delete on expiration attribute 1106. For example, if the object premium level attribute 1006 indicates that the multimedia content 902 is premium content, the delete on expiration attribute 1106 can be set and unexposed to being unset. The delete on expiration attribute 1106 can cause content to be deleted when at least one of the terminal expression attributes 1004 are met.

Figure 12:
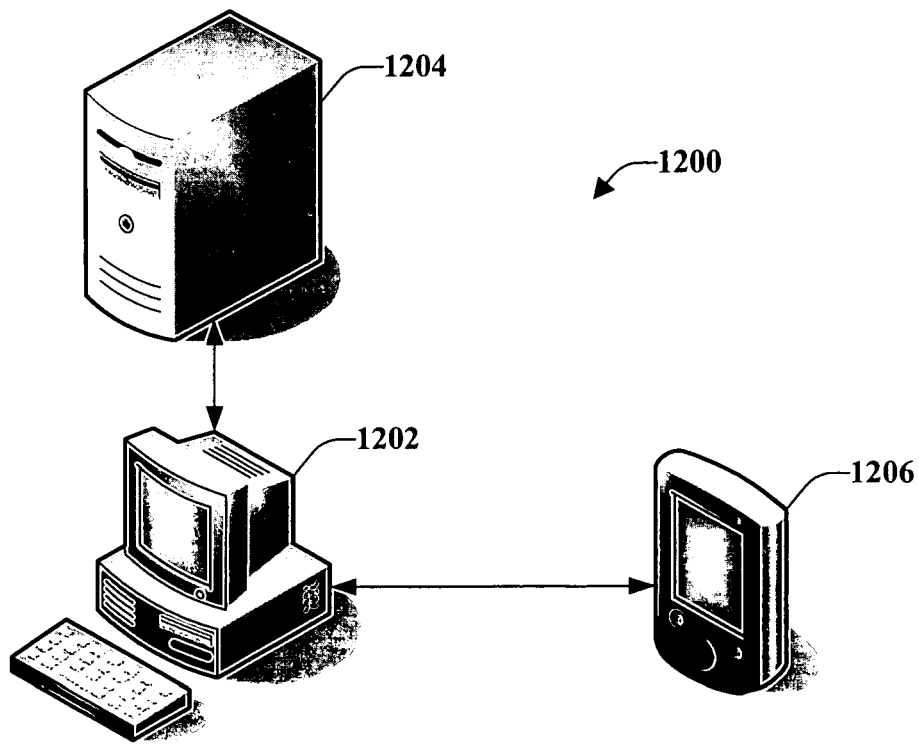
FIG. 12 is an exemplary system that facilitates communicating multimedia content and business rules associated therewith to a portable device

Referring now to FIG. 12, an exemplary system 1200 that can be employed to transfer premium multimedia content and business rules associated therewith to a portable device is illustrated. The system 1200 includes a personal computer 1202 that accesses a server 1204 to obtain premium multimedia content. For instance, payment can be provided from the personal computer 1202 to the server 1204 for rental of a particular video for a certain amount of time and/or a particular number of views. The personal computer 1202 can be communicatively coupled to a portable device 1206 to which the multimedia content is desirably delivered. The personal computer 1202 and the portable device 1206 can be synchronized, and the personal computer can determine that the portable device 1206 (which can be a closed system) supports extensions to a communications protocol that can be utilized to provide business rules with the multimedia content. For instance, the extensions can be associated with attributes that determine a number of allowable views of the multimedia content, a time frame within which the multimedia content can be viewed, etc. These business rules can then be enforced on the portable device 1206.

Figure 13:
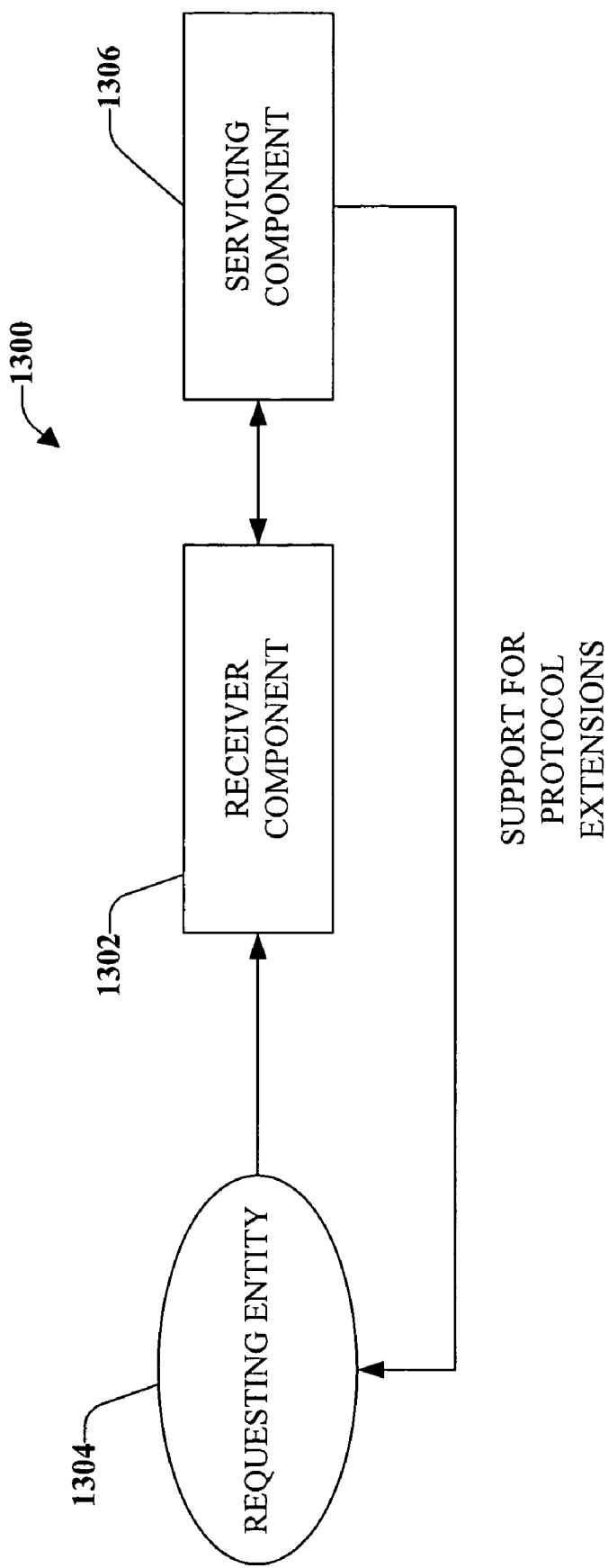
FIG. 13 is a block diagram of a system that facilitates updating a requesting entity with protocol extensions that enable transmission of multimedia content and business rules associated therewith.

Now turning to FIG. 13, a system 1300 that facilitates provision of support for the herein described protocol extensions to a requesting entity is illustrated. The system 1300 can include a receiver component 1302 that receives a request for support for the protocol extensions from a requesting entity 1304. For instance, the requesting entity 1304 can be a portable device and/or a stationary device (e.g., a host unit). Thus, the requesting entity 1304 can be a personal computer that provides the request to a server that maintains the protocol and extensions thereto. Additionally, the requesting entity 1304 can be a portable device that provides the request to such a server. Moreover, the requesting entity 1304 can be a portable device that provides the request to a host device, such as a personal computer. The receiver component 1302 can provide such a request to a servicing component 1306, which can then service such request by delivering support for the protocol extensions to the requesting entity 1304. Accordingly, the system 1300 can be employed to update a device so that it supports the protocol extensions.

Figure 14:
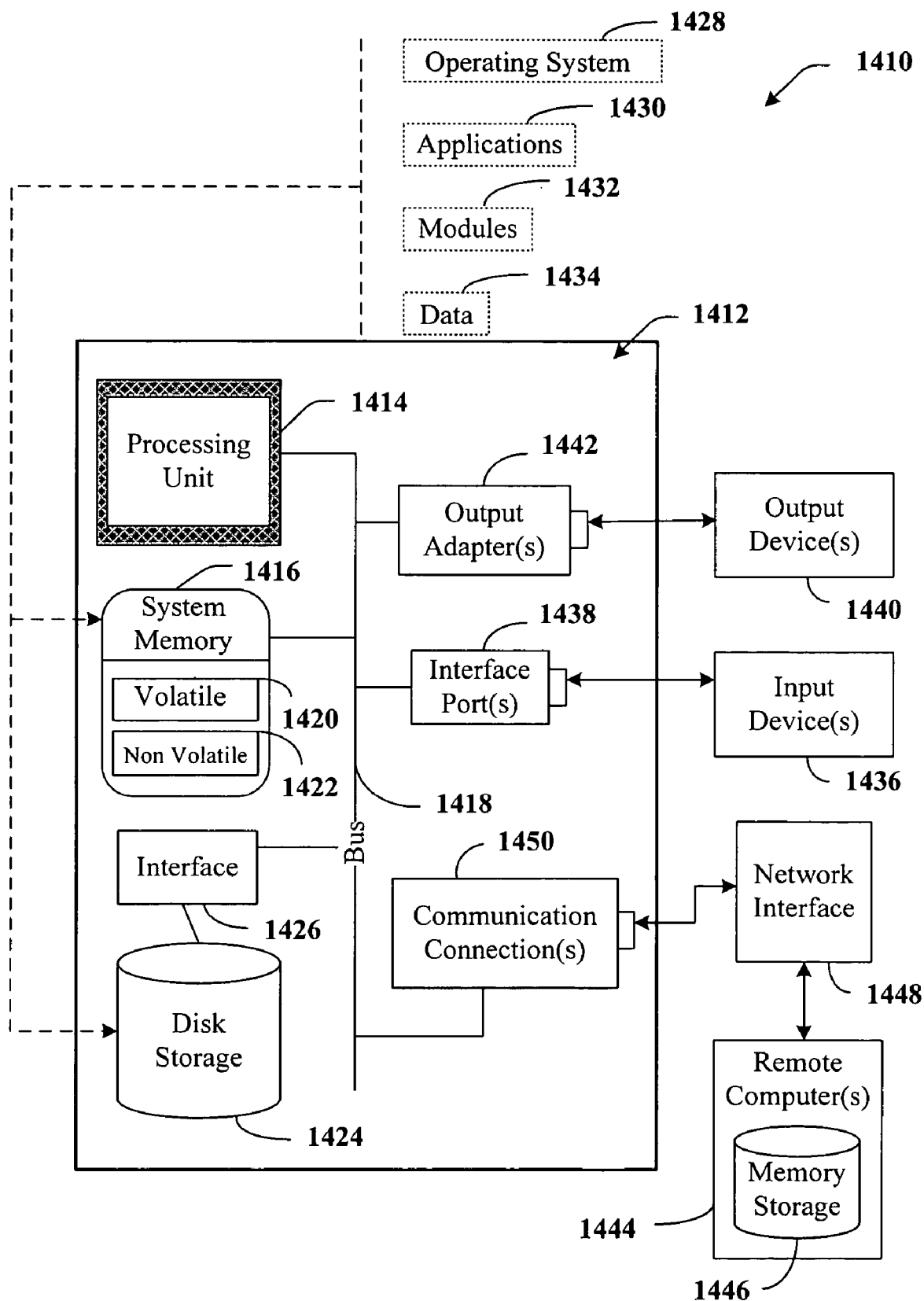
FIG. 14 is a schematic block diagram illustrating a suitable operating environment.

In order to provide additional context for various aspects of the claimed subject matter, FIG. 14 and the following discussion are intended to provide a brief, general description of a suitable operating environment 1410 in which various aspects of the claimed subject matter may be implemented. While described in the general context of computer-executable instructions, such as program modules, executed by one or more computers or other devices, those skilled in the art will recognize that the claimed subject matter can also be implemented in combination with other program modules and/or as a combination of hardware and software.

Generally, however, program modules include routines, programs, objects, components, data structures, etc. that perform particular tasks or implement particular data types. The operating environment 1410 is only one example of a suitable operating environment and is not intended to suggest any limitation as to the scope of use or functionality of the claimed subject matter. Other well known computer systems, environments, and/or configurations that may be suitable for use with such subject matter include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 14, an exemplary environment 1410 for implementing various aspects of the invention includes a computer 1412. The computer 1412 includes a processing unit 1414, a system memory 1416, and a system bus 1418. The system bus 1418 couples system components including, but not limited to, the system memory 1416 to the processing unit 1414. The processing unit 1414 can be any of various available processors. Dual microprocessors and other multiprocessor architectures also can be employed as the processing unit 1414. The computer 1412 can be a host computer that provides multimedia content to a portable device, the portable device, and/or a server that provides support for protocol extensions to the host computer and/or portable device.

The system bus 1418 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI). The system memory 1416 includes volatile memory 1420 and nonvolatile memory 1422. The basic input/output system (BIOS), containing the basic routines to transfer information between elements within the computer 1412, such as during start-up, is stored in nonvolatile memory 1422. By way of illustration, and not limitation, nonvolatile memory 1422 can include read only memory (ROM), programmable ROM (PROM), electrically programmable ROM (EPROM), electrically erasable ROM (EEPROM), or flash memory. Volatile memory 1420 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1412 also includes removable/nonremovable, volatile/nonvolatile computer storage media. FIG. 14 illustrates, for example a disk storage 1424. Disk storage 1424 includes, but is not limited to, devices like a magnetic disk drive, floppy disk drive, tape drive, Jaz drive, Zip drive, LS-100 drive, flash memory card, or memory stick. In addition, disk storage 1424 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1424 to the system bus 1418, a removable or non-removable interface is typically used such as interface 1426.

It is to be appreciated that FIG. 14 describes software that acts as an intermediary between users and the basic computer resources described in suitable operating environment 1410. Such software includes an operating system 1428. Operating system 1428, which can be stored on disk storage 1424, acts to control and allocate resources of the computer system 1412. System applications 1430 take advantage of the management of resources by operating system 1428 through program modules 1432 and program data 1434 stored either in system memory 1416 or on disk storage 1424. It is to be appreciated that the claimed subject matter can be implemented with various operating systems or combinations of operating systems.

A user enters commands or information into the computer 1412 through input device(s) 1436. Input devices 1436 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1414 through the system bus 1418 via interface port(s) 1438. Interface port(s) 1438 include, for example, a serial port, a parallel port, a game port, and a universal serial bus (USB). Output device(s) 1440 use some of the same type of ports as input device(s) 1436. Thus, for example, a USB port may be used to provide input to computer 1412, and to output information from computer 1412 to an output device 1440. Output adapter 1442 is provided to illustrate that there are some output devices 1440 like monitors, speakers, and printers among other output devices 1440 that require special adapters. The output adapters 1442 include, by way of illustration and not limitation, video and sound cards that provide a means of connection between the output device 1440 and the system bus 1418. It should be noted that other devices and/or systems of devices provide both input and output capabilities such as remote computer(s) 1444.

Computer 1412 can operate in a networked environment using logical connections to one or more remote computers, such as remote computer(s) 1444. The remote computer(s) 1444 can be a personal computer, a server, a router, a network PC, a workstation, a microprocessor based appliance, a peer device or other common network node and the like, and typically includes many or all of the elements described relative to computer 1412. For purposes of brevity, only a memory storage device 1446 is illustrated with remote computer(s) 1444. Remote computer(s) 1444 is logically connected to computer 1412 through a network interface 1448 and then physically connected via communication connection 1450. Network interface 1448 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1450 refers to the hardware/software employed to connect the network interface 1448 to the bus 1418. While communication connection 1450 is shown for illustrative clarity inside computer 1412, it can also be external to computer 1412. The hardware/software necessary for connection to the network interface 1448 includes, for exemplary purposes only, internal and external technologies such as, modems including regular telephone grade modems, cable modems and DSL modems, ISDN adapters, and Ethernet cards.

Figure 15:
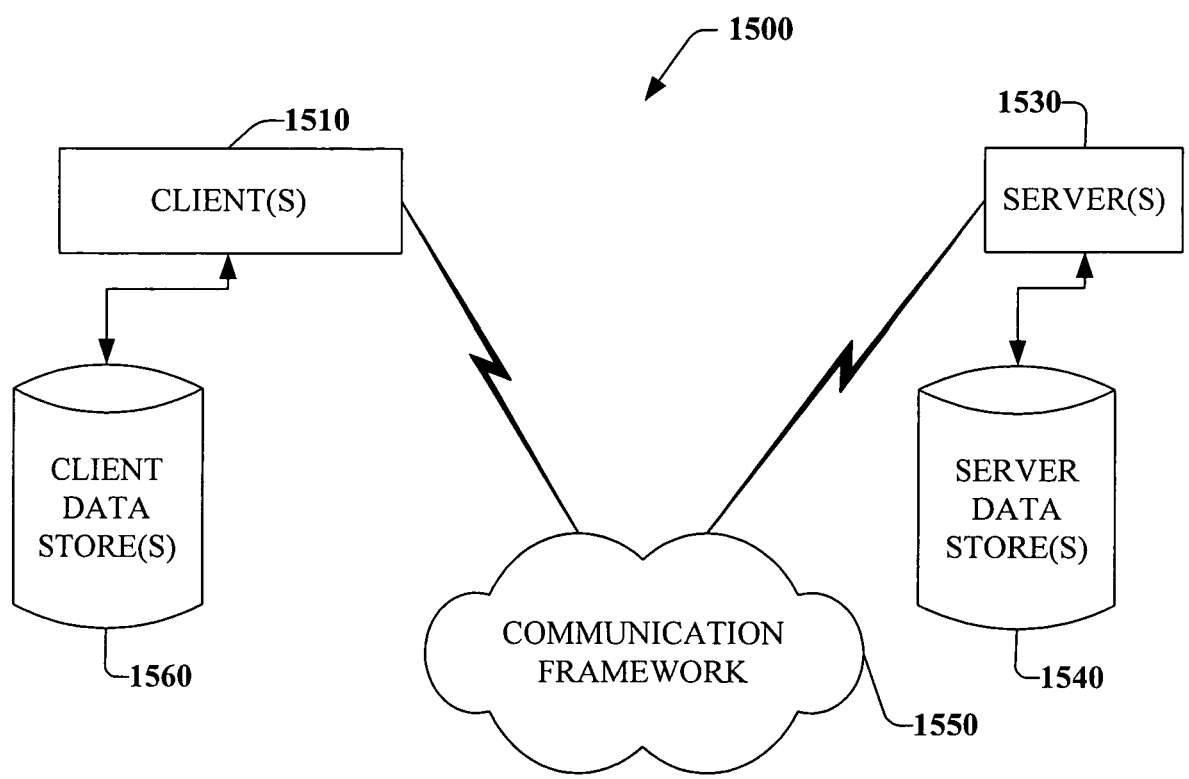
FIG. 15 is a schematic block diagram of a sample-computing environment.

FIG. 15 is a schematic block diagram of a sample-computing environment 1500 with which the claimed subject matter can interact. The system 1500 includes one or more client(s) 1510. The client(s) 1510 can be hardware and/or software (e.g., threads, processes, computing devices). The system 1500 also includes one or more server(s) 1530. The server(s) 1530 can also be hardware and/or software (e.g., threads, processes, computing devices). The servers 1530 can house threads to perform transformations by employing the subject invention, for example. One possible communication between a client 1510 and a server 1530 can be in the form of a data packet adapted to be transmitted between two or more computer processes. The system 1500 includes a communication framework 1550 that can be employed to facilitate communications between the client(s) 1510 and the server(s) 1530. The client(s) 1510 are operably connected to one or more client data store(s) 1560 that can be employed to store information local to the client(s) 1510. Similarly, the server(s) 1530 are operably connected to one or more server data store(s) 1540 that can be employed to store information local to the server(s) 1530. In one particular example, the server(s) can maintain protocol extensions that enable transmittal of multimedia content and business rules to a portable device. The client(s) 1510 can request support for such protocols from the server(s) 1530, which can then service the request.

What has been described above includes examples of the claimed subject matter. It is, of course, not possible to describe every conceivable combination of components or methodologies for purposes of describing such subject matter, but one of ordinary skill in the art may recognize that many further combinations and permutations are possible. Accordingly, the claimed subject matter is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates implementation of business rules for multimedia content on a portable device comprising:
   a processor;
   a memory communicatively coupled to the processor, the memory having stored therein computer-executable instructions configured to implement the system, including:
      a receiver component that receives a request for support of extensions to a protocol that enable transfer of customized business rules associated with multimedia content from a host device to the portable device, the portable device is a closed system, wherein the business rules specify at least one of an allowable usage count for the multimedia content at the portable device or a window of time during which the multimedia content is locally accessible at the portable device;
      a servicing component that provides the requested support to an entity that initiated the request;
      a querying component that queries the portable device to determine whether the portable device supports the protocol extensions that enable the business rules to be transmitted to the portable device and enforced by the portable device; and
      a transmitting component that transmits the multimedia content to the portable device via the protocol and transmits the business rules to the portable device via the protocol extensions if it is determined that the protocol device supports the protocol extensions,
      wherein the host device, if it is determined that the protocol device does not support the protocol extensions:
         retrieves support of the protocol extensions; and
         provides the support of the protocol extensions, the multimedia content, and the business rules to the portable device.

2. The system of claim 1, the multimedia content is one of audio content, video content, or audio/video content.

3. The system of claim 1, the protocol is the Media Transfer Protocol.

4. The system of claim 1, the extensions support transmittal of at least one of a terminal expression attribute indicating a condition for deleting the multimedia content at the portable device and one or more enforcement attributes from the host device to the portable device, the one or more enforcement attributes including at least a "set once" attribute that prevents values sent to the portable device relating to the multimedia content from being set more than once.

5. The system of claim 1, further comprising a synchronization component that synchronizes the host device with the portable device.

6. The system of claim 1, further comprising an enforcement component that prohibits communication of the multimedia content from the host device to the portable device when the querying component determines that the protocol extensions are not supported.

7. The system of claim 1, further comprising an implementation component that enforces the business rules with respect to the multimedia content at the portable device.

8. The system of claim 1, further comprising a notification component that provides a user with a notification based at least in part upon the business rules.

9. The system of claim 8, the notification component informs the user that an additional license is required to enable execution of the multimedia content.

10. The system of claim 1, further comprising a download component that automatically downloads the extensions and associates the protocol extensions with the portable device.

11. The system of claim 1, further comprising an updating component that automatically provides the portable device with updates to the protocol extensions.

12. The system of claim 1, the portable device is one of a dedicated media player, a personal digital assistant, or a mobile telephone, and the host device is one of a personal computer, a laptop computer, or a personal digital assistant.

13. A method for enabling communication of customized business rules to a portable device together with multimedia content comprising:
    employing a processor executing computer-executable instructions stored on a computer-readable storage medium to implement the following acts:
       receiving a request for support for extensions to a protocol that enable transmission of the customized business rules to the portable device, the portable device is a closed system, the customized business rules defining at least one restriction on usage of the multimedia content at the portable device, the restriction including at least one of an allowable usage count for the multimedia content at the portable device or a window of time during which the multimedia content is locally accessible at the portable device;
       providing the support for the extensions to at least one of a host associated with the mobile device or the mobile device;
       querying the mobile device to determine whether the mobile device supports the extensions that enable the business rules to be transmitted to the portable device and enforced by the mobile device;
       transmitting the multimedia content to the portable device via the protocol if it is determined that the portable device supports the protocol extensions;
       transmitting the business rules to the portable device if it is determined that the portable device supports the protocol extensions; and
       if it is determined that the protocol device does not support the protocol extensions:
          retrieving support of the protocol extensions; and
          providing support of the protocol extensions, the multimedia content, and the business rules to the portable device.

14. The methodology method of claim 13, the protocol extensions are extensions to the Media Transfer Protocol.

15. The method of claim 13, further comprising:
synchronizing the portable device to the host device;
determining whether the portable device supports the extensions; and
generating the request when it is determined that the portable device does not support the extensions.

16. The method of claim 14, further comprising providing a notification to a user of the mobile device based at least in part upon content of the customized business rule.

17. A computer-readable storage medium bearing computer executable instructions implemented on a computer, the computer executable instructions for performing acts comprising:
synchronizing a host device with a portable device, the portable device is a closed system;
determining whether protocol extensions that enable transfer of business rules defining restrictions on local usage of multimedia content are supportable by the portable device and enforced by the portable device;
downloading support for the protocol extensions to the portable device when it is determined that the extensions are supportable, the support including at least support for a "set once" attribute that prevents values relating to the multimedia content sent to the portable device from being set more than once;
communicating multimedia content from the host device to the portable device by way of the protocol and communicating a customized business rule associated with the multimedia content by way of the protocol extensions upon the host device synchronizing with the portable device, the customized business rule including at least a definition of a play period during which the multimedia content is playable at the portable device, wherein the multimedia content and business rules are communicated only if it is determined that the portable device supports the protocol extensions; and
if it is determined that the protocol device does not support the protocol extensions, at the host device:
requesting support of the protocol extensions from a server that maintains support for the protocol extensions;
receiving support of the protocol extensions from the server; and
communicating support of the protocol extensions, the multimedia content, and the business rules to the portable device.

* * * * *